United States Patent Office 3,605,754
Patented Sept. 20, 1971

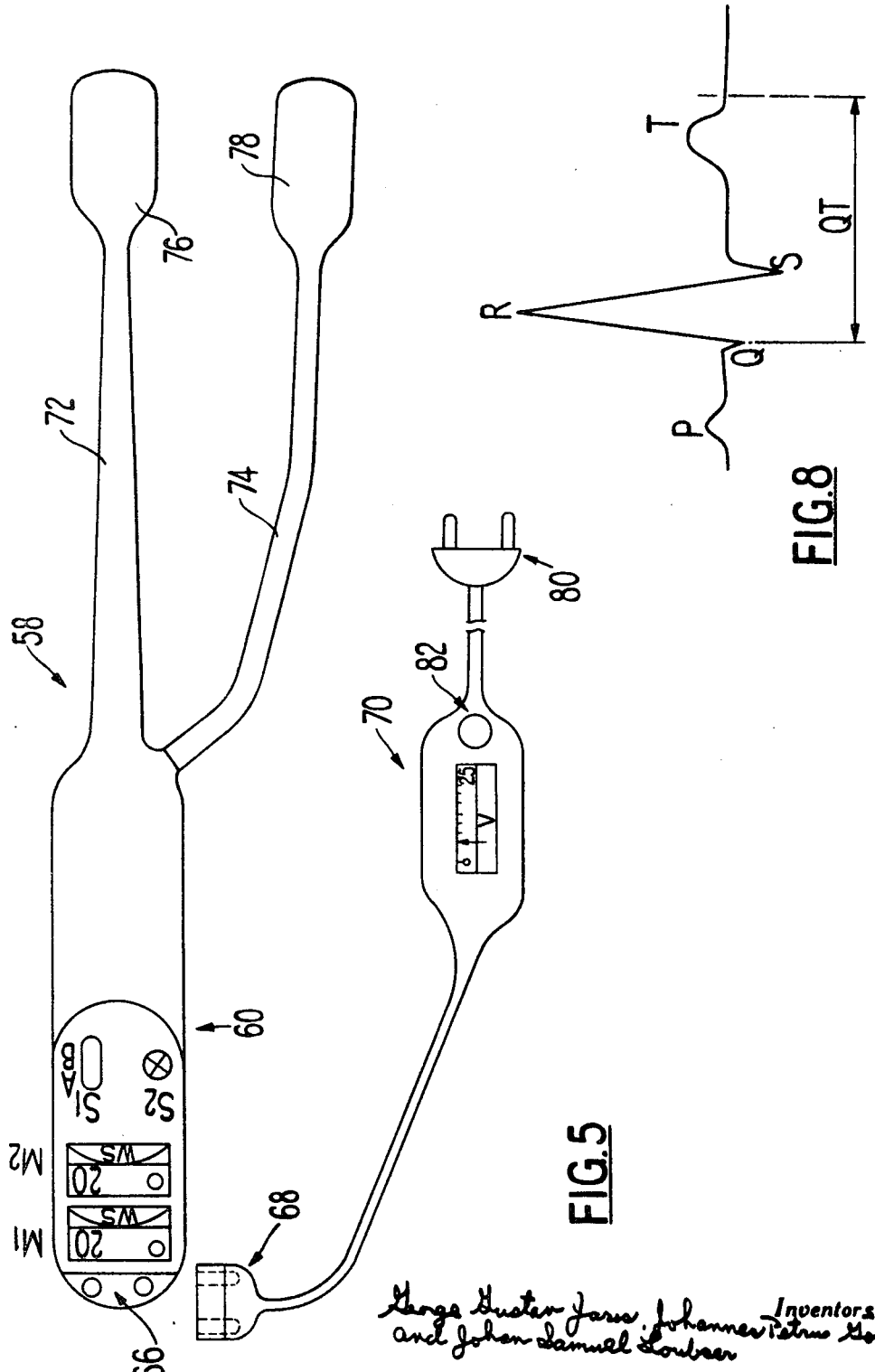

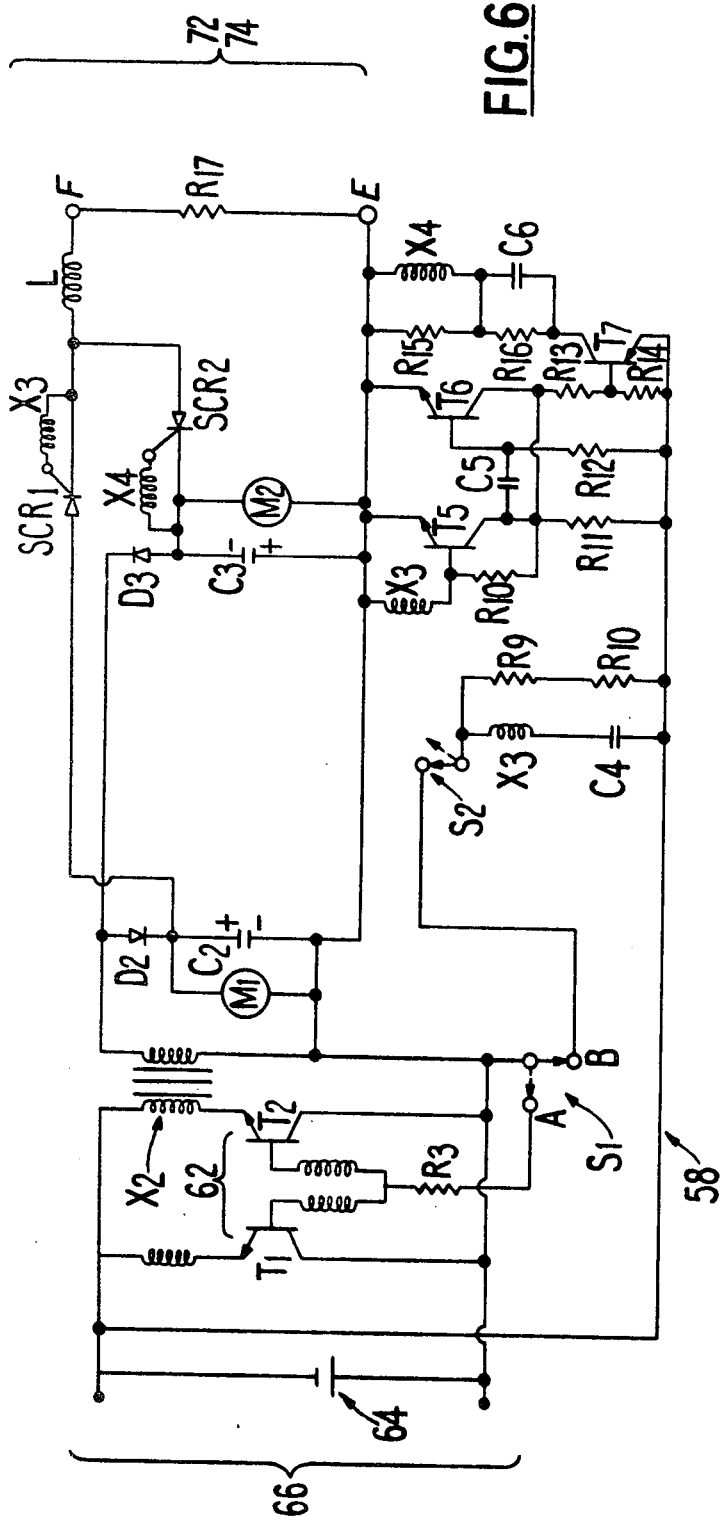

3,605,754
DOUBLE PULSE HEART DEFIBRILLATOR AND METHOD OF USE
George Gustav Jaros, Johannes Petrus Gous, and Johan Samuel Loubser, Pretoria, Republic of South Africa, assignors to South African Inventions Development Corporation, Scientia, Pretoria, Transvaal Province, Republic of South Africa
Filed Sept. 25, 1968, Ser. No. 776,843
Claims priority, application Republic of South Africa, Nov. 23, 1967, 67/7,057
Int. Cl. A61n *1/36*
U.S. Cl. 128—419D          5 Claims

ABSTRACT OF THE DISCLOSURE

A method of defibrillating a heart, which includes depolarizing by a first electrical pulse, those heart muscle fibres which are in a receptive state, and of later depolarizing heart muscle fibres by a second electrical pulse at a time interval after the first pulse, sufficient to permit all the heart muscle fibres to be simultaneously in a receptive state. The apparatus has energy storage capacitors which are charged from a variable power supply via a capacitor charge and impulse discharge inverter and discharged when desired under the control of a stored energy monitor via damping and safety circuits to energize electrodes.

---

Figure 1:
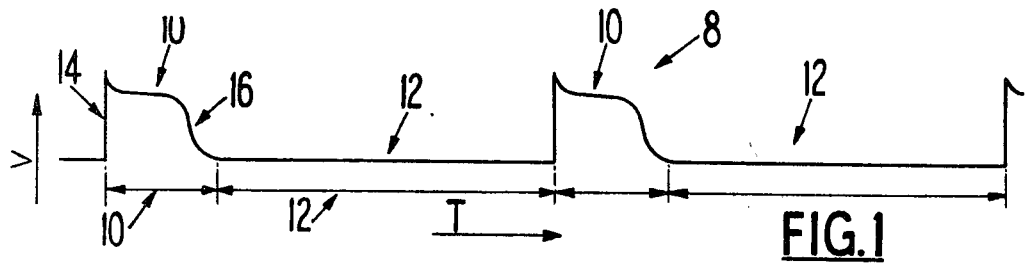

This invention relates to the defibrillation of heart.

Hearts can be wholly or partially in the fibrillative state due to unintentional causes such as electrical accidents or some diseased condition. Hearts are also intentionally brought to this state for open-heart surgery. In order to restore a heart to normal functioning, it is necessary to defibrillate it. It is desirable to restore the heart as quickly as possible to such normal functioning with as little remaining arrhythmia as possible and preferably without arrhythmia at all.

The beating of the heart is the result of the cyclic depolarization and repolarization of the heart muscle fibres in synchronism. When the heart is in a fibrillative state these muscle fibres are out of synchronism in that depolarization and repolarization of the various muscle fibres take place at random. Defibrillation of a heart out of its fibrillative state, involves the resynchronisation of the various heart muscle fibres by causing them to depolarize and repolarize in synchronism to provide the rhythmical beating of the heart. The best defibrillation is where all the muscle fibres are brought to synchronism. If some muscle fibres are still out of synchronism then that will be evident as arrhythmia. The degree of arrhythmia will depend upon the degree of asynchronism. Such arrhythmia will be evident on an electrocardiogram.

It is an object of this invention to provide a method of defibrillating a heart and apparatus therefor, which achieves defibrillation with less arrhythmia than other methods and apparatus known to the applicant.

According to the invention, a method of defibrillating a fibrillating heart of a patient, includes the steps of depolarizing those heart muscle fibres which are in a receptive state, by a first electrical pulse, and of later depolarizing heart muscle fibres by a second electrical pulse at a time interval after the first pulse, sufficient to permit all the heart muscle fibres to be simultaneously in a receptive state.

In other words, the time interval between the pulses should exceed the depolarized period of the heart muscle fibres.

In practice, it will be found that this time interval will be somewhat greater than the QT period as determined for the patient on an electrocardiogram.

This second pulse is preferably of a polarity opposite to that of the first. The pulses are preferably smooth pulses and not square pulses. The pulses may be applied externally or directly to the heart itself. The pulses will be above the threshold potential.

Further according to the invention, a method of defibrillating the fibrillating heart of a patient, includes the step of applying successive electrical pulses of opposite polarity to the heart at a short time interval between them.

The pulses may have a substantially equal energy content so that the ionic balance of the heart remains substantially unchanged.

The invention extends also to a heart defibrillator adapted to provide two successive electrical pulses at a time interval between them within the range of 200 and 500 milliseconds. The pulses may be smooth pulses of opposite polarity. The defibrillator may include adjusting means for adjusting the length of the time interval between pulses. The defibrillator may be adapted to provide pulses of substantially equal energy content up to a value of about 400 wattseconds. Each pulse may be of about 12 milliseconds duration.

In order to understand the terminology used, the relevant features of the functioning of a heart will now be described with reference to the accompanying drawings. Specific embodiments of the invention are also described by way of example with reference to the drawings.

Figure 2:
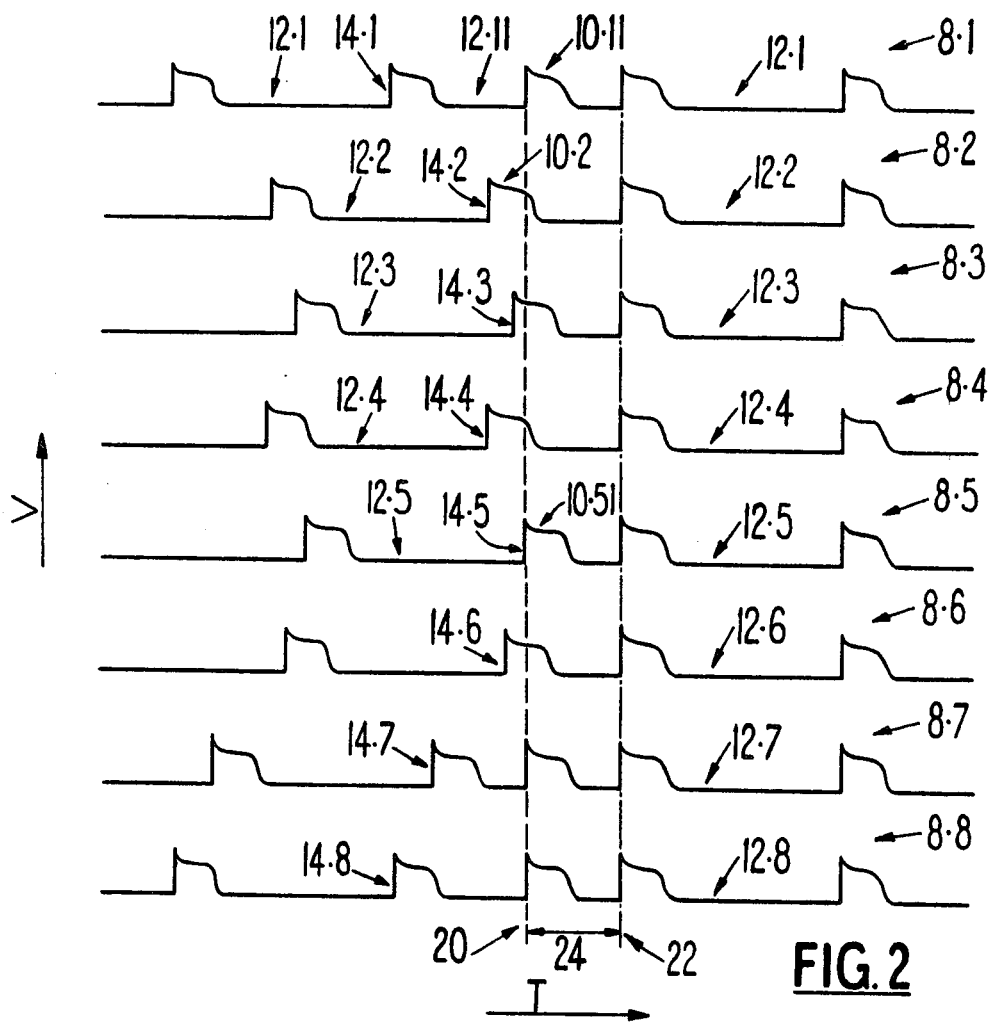
Figure 3:
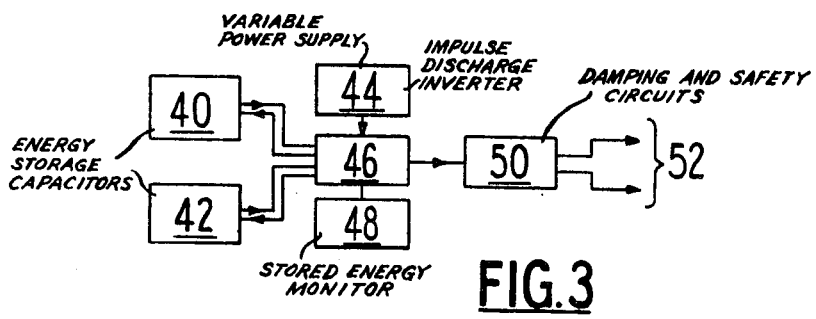
Figure 4:
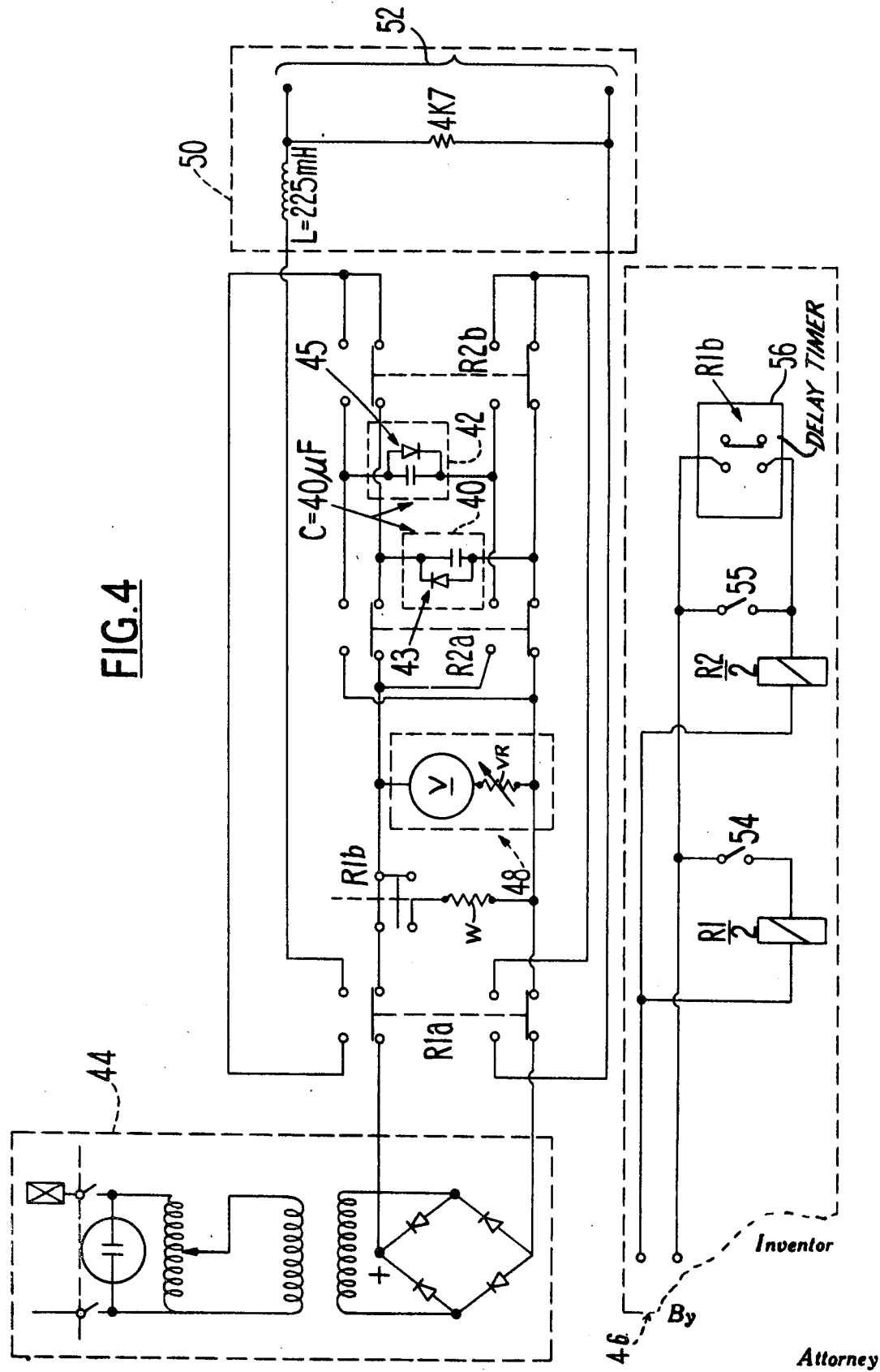

In the drawings:
FIG. 1 shows diagrammatically the cyclic depolarization and repolarization of individual muscle fibres of a heart;
FIG. 2 shows the out of phase cycles of various zones or layers of heart muscle fibres when the heart is in a fibrillative state;
FIG. 3 shows a block diagram of a defibrillator according to the invention;
FIG. 4 shows a circuit diagram of a general purpose defibrillator according to the invention;
FIG. 5 shows another embodiment of the invention suitable for theatre use, together with its charger;
FIG. 6 shows a circuit diagram of the defibrillator of FIG. 5;
FIG. 7 shows a circuit diagram of its charger; and
FIG. 8 shows a typical electrocardiogram trace.

Referring to FIG. 1 of the drawings, reference numeral 8 shows diagrammatically the cyclic depolarization and repolarization of heart fibres, volts (V) being plotted against time (T). The depolarized portion of the cycle (on or non-receptive state) is indicated by reference numeral 10, and the polarized portion (off or receptive state) of the cycle is indicated by 12. Together these two periods make up a complete cycle. The portion 14 of the curve denotes depolarization, and the portion 16 denotes repolarization.

For human beings, the portion 10 lasts usually for a period of the order of 300–400 milliseconds, and the portion 12 lasts for a period of the order of 500–400 milliseconds.

For different species of anuimals, the "on" periods of the heart muscle fibres or the QT periods, fall within distinct ranges. Also, for some individuals in a particular species, the "on" or QT periods may be in the low region of range for that species, while for other individuals it may be in the high region of range for that species. Thus, for human beings, an interpulse interval of, say, about 420 milliseconds, will probably be suitable for 80% to 90% of cases. There may be the odd case here and there where this interval may be too short or too long. The actual criterion, however, is the period of time during which the heart muscle fibres are depolarized. That is, the interpulse interval should exceed this said period of time during which the heart muscle fibres are in a depolarized state.

When a heart fibre is in the polarized state, it is receptive and can be depolarized by an external stimulus such as an electric shock. In the depolarized state it is non-receptive or non-responsive to such stimulus and is referred to as being in the "on" state.

An external stimulus will cause the heart fibre to become depolarized. It will do so by having a typical action potential curve as shown in FIG. 1, but then the new normal cyclic period will proceed from the time when the stimulus was applied. In other words, the action potential of the fibres will have become advanced in time-phase.

Referring now to FIG. 2 of the drawings, the various diagrams 8.1, 8.2, 8.3, up to 8.8 refer to typical action potential cycles of various groups of heart fibres when the heart is in a fibrillative state. It will be noted that the various "on" states of the fibres are out of synchronism with each other, i.e. the various portions 14.1, 14.2, 14.3, and so on, of the various curves are out of time-phase with each other. This is shown by having them out of alignment diagrammatically along the time axis (T).

In order to bring the heart out of this fibrillative state to normal functioning, it is necessary to bring the various fibres into synchronism, i.e. into time-phase with one another. Diagrammatically this may be represented by having all the portions 14.1, 14.2, 14.3, and 14.4, and so on, of the various curves 8.1, 8.2, 8.3, and 8.4, and so on, in alignment. In FIG. 2 they are shown out of alignment.

According to the invention, fibres are brought into alignment by stimulating the heart muscle fibres as at 20 at any arbitrary instant by an electrical pulse and of then following up this pulse by one of opposite polarity a short time interval later, as at 22, the time interval 24 being greater than the non-receptive period 10 of the heart fibres. This time interval will be somewhat greater than the QT period as determined on an electrocardiogram for the patient. This period is indicated in FIG. 8 in which a typical ECG trace is shown.

The state of the various fibres will be considered when the pulse at 20 is given. The fibres for curve 8.1 at this point in time are in a receptive state 12.11 and upon stimulation the fibres become depolarized as at 10.11. A time-phase shift for this group of fibres takes place because period 12.11 is shorter than period 12.1. The fibres for curve 8.2 are in a non-receptive or "on" state 10.2 and hence cannot be stimulated and no time-phase shift for this group of fibres takes place upon this stimulation. The same applies to the fibres for curves 8.3 and 8.4. The fibres for curve 8.5 are in a receptive state 12.5 and become depolarized as at 10.51. A time-phase shift also takes place here. The fibres for curve 8.6 are also in the "on" state 10.6, can therefore not be stimulated, and no time-phase shift takes place. The fibres for curves 8.7 and 8.8 are in a similar state to the fibres for curves 8.1 and 8.5.

After the further pulse is applied as at 22 at a time interval 24 after the pulse 20, then it will be noted that all the various groups of fibres are in a receptive state. Those which were non-receptive before, viz. 8.2, 8.3, 8.4, and 8.6, are now receptive. So also are those now receptive which were receptive before, viz. 8.1, 8.5, 8.7 and 8.8, and which were stimulated by the first pulse 20. The second pulse as at 22 brings the functioning of all the fibres into synchronism, regardless of the stage at which the first pulse 20 was given.

Referring now to FIG. 3 of the drawings, reference numerals 40 and 42 refer to energy storage capacitors which are charged from a variable power supply 44 via a capacitor charge and impulse discharge inverter 46. These capacitors are discharged when desired under the control of a stored energy monitor 48 via damping and safety circuits 50 to energize electrodes (internal or external) connected to the apparatus as at 52.

FIG. 4 shows the circuitry in greater detail. The blocks in FIG. 3 have been shown in this diagram.

In the switching position shown, capacitor 40 is charged to the voltage set by the variable power supply 44. Then the relay coil R2 is activated by closure of the switch 55. Its contacts switch over and the capacitor 42 is charged to the voltage set by 44, via the contacts R2a. The contacts R2a are then returned to the position shown in the drawings (connected to capacitor 40). The manual shock switch 54 is then closed. Capacitor 40 discharges through 50 to connections 52 and the tendency to overshoot is eliminated by the freewheeling diode 43. After a delay governed by delay timer 56, the contacts R1b operate and relay R2 becomes energized, and the contacts R2a and R2b become operated and capacitor 42 becomes discharged, thereby energizing connections 52 as before. The tendency to overshoot is prevented by freewheeling diode 45. Thereafter the whole procedure may be repeated. The delay timer 56 may be adjustable to permit variation of the time interval between pulses, if necessary.

In practice it may sometimes be desirable to discharge the capacitors 40 and 42 without applying the electrodes to a person. Thus the energy selected may be too high, or no further defibrillation shocks may be required. The resistor W acts as a discharging resistor permitting the capacitors to discharge slowly when the contacts R1b are closed.

The energy monitor 48 includes typically a voltmeter V, and a variable resistance VR in series therewith used for calibration.

For human beings, the individual pulses are preferably smooth, unidirectional and of a duration of about 12 milliseconds each. This time interval between pulses, provided by the instrument, is preferably between 200 and 500 seconds. The energy input per pulse may be up to about 400 wattseconds. By a "unidirectional" pulse is meant a pulse which is truly unidirectional in that it has no overshoot.

In use, electrodes are connected to the appropriate terminals 52 and they are applied externally or internally depending upon the electrodes being used and the circumstances.

Referring now to FIGS. 5 to 7 of the drawings, there is shown a portable sterilizable defibrillator 58 suitable for open chest use by a surgeon. This instrument conveniently has a power capacity of about 40 wattseconds per pulse.

The instrument 58 comprises a handle portion 60 having an oscillator 62 (see FIG. 6), a battery 64, a transformer X2, a switch S1, a switch S2, and meters M1 and M2. The handle also has a pair of pins 66 for engaging with the plug socket connection 68 of the charger, generally indicated by reference numeral 70. This charger will be described more fully later. The instrument has two limbs 72 and 74, at least one of which, e.g. 74, is resiliently flexible. At the ends of the limbs are provided the electrodes 76 and 78. The electrodes are shaped and positioned relative to each other for easy application to the outer surface of a heart.

The charger 70 has a plug 80 for connection to the mains, and includes a transformer X1 and rectifying circuit 81 for charging the defibrillator. It includes an indicator light 82 and meter M3 to indicate when it is being charged. It also includes a fuse F1. It has a meter M3 to indicate the voltage of the battery 64.

In use, the defibrillator 58 is normally connected to the charger on trickle charge to ensure that its battery is fully charged and that it is always ready for use. When required for use, the defibrillator is disconnected and sterilized.

In order to carry out defibrillation, the surgeon pushes switch S1 from position B to position A. The transistors T1 and T2 start to oscillate and switch power from battery 64 to capacitors C2 and C3 via transformer X2. When the desired energy in wattseconds has been reached, (read off on the meters M1 and M2), the switch S1 is allowed to return to position B. (It is biased to this position.) The electrodes are applied to the heart and the pushbutton switch S2 is pressed. This switches SCR1 and a positive pulse is delivered to the electrodes (via the connections F and E of FIG. 6).

The switch S2 also switches on the monostable T5, T6, T7. After a fixed delay time determined by R12 and C5, SCR2 is switched on through X4 and a negative pulse is applied to the electrodes. This procedure may be repeated as necessary. C2 and C3 then become automatically discharged in about 15 seconds.

This theatre instrument can be used by a surgeon without any technical assistance to operate it. This instrument therefore becomes in the hands of a surgeon an instrument like any other of his instruments over which he can exercise sole control. The need for a technician to assist the surgeon therefore falls away, and so also does the need for unsterilized equipment in or communicating with the theatre. This of course has great advantages in surgery where it is important to have aseptic conditions.

A defibrillator according to the invention is inherently safe to use. The time interval between pulses is built into the instrument. It can therefore be used by a layman without requiring special knoweldge. Also, atrial defibrillation can be undertaken without requiring special synchronizing equipment and without fear that a pulse will fall in the socalled vulnerable period. With this double pulse defibrillator no synchronisation is necessary. Even if the first pulse falls in the vulnerable period and causes asynchronism, the second pulse will find all heart muscle fibres in the receptive state and will synchronize them totally. This is an advantage over complicated conventional techniques in which synchronisation is necessary in order to ensure that the pulse does not fall in the socalled vulnerable period.

What we claim is:

1. A method of defibrillating a fibrillating heart of a patient, which includes the steps of generating two electrical pulses of opposite polarity in succession at a time interval between them of from 200 to 500 milliseconds, and of applying the electrical pulses to the patient.

2. A defibrillator for the defibrillation of a fibrillating heart of a patient, and which includes means adapted for application to the patient, and electrical pulse generating means for supplying pulses to said aforementioned means and for generating two electrical pulses of opposite polarity at a time interval between them falling within the range of 200 and 500 milliseconds.

3. A defibrillator as claimed in claim 2 which includes two capacitors dischargeable independently of each other through the application means; means for charging the capacitors; means for discharging the first capacitor; and means for discharging the second capacitor automatically after the said time interval after the first capacitor has been discharged.

4. A defibrillator as claimed in claim 3 in which the means for discharging the first capacitor includes a first silicon controlled rectifier connected between the application means and the first capacitor and switch means operable to render the first silicon controlled rectifier conductive to discharge the first capacitor; and in which the means for discharging the second capacitor includes a second silicon controlled rectifier connected in parallel with the first silicon controlled rectifier, and a time delay circuit operatively connected to the two silicon controlled rectifiers for rendering the second silicon controlled rectifier conductive automatically to discharge the second capacitor after the said time interval after the first capacitor has been discharged.

5. A method of defibrillating a fibrillating heart of a patient which includes the steps of:
  determining the QT period of the patient,
  generating pulses of opposite polarity with a time interval between them greater than the QT period,
  depolarizing those heart muscle fibres which are in a receptive state by a first electrical pulse, and
  subsequently depolarizing heart muscle fibres by a second electrical pulse of opposite polarity at a time interval after the first pulse sufficient to permit all the heart muscle fibres to be simultaneously in a receptive state.

References Cited

UNITED STATES PATENTS

| | | | |
|---|---|---|---|
| 3,481,341 | 12/1969 | Siedband | 128—419D |
| 3,093,136 | 6/1963 | Lohr | 128—423 |
| 3,241,555 | 3/1966 | Cayweed et al. | 128—421 |

OTHER REFERENCES

Cobbold et al.: "Medical Electronics and Biological Engineering," vol. 3, No. 3, July 1965, pp. 273–277.

WILLIAM E. KAMM, Primary Examiner